United States Patent
Shimazu

(10) Patent No.: US 8,977,984 B2
(45) Date of Patent: Mar. 10, 2015

(54) MOBILE ELECTRONIC DEVICE, SCREEN CONTROL METHOD AND ADDITIONAL DISPLAY PROGRAM

(75) Inventor: Naoya Shimazu, Kyoto (JP)

(73) Assignee: Kyocera Corporation, Kyoto-Shi, Kyoto (JP)

( * ) Notice: Subject to any disclaimer, the term of this patent is extended or adjusted under 35 U.S.C. 154(b) by 0 days.

(21) Appl. No.: 13/812,682

(22) PCT Filed: Jul. 28, 2011

(86) PCT No.: PCT/JP2011/067354
§ 371 (c)(1),
(2), (4) Date: Jan. 28, 2013

(87) PCT Pub. No.: WO2012/015006
PCT Pub. Date: Feb. 2, 2012

(65) Prior Publication Data
US 2013/0122967 A1    May 16, 2013

(30) Foreign Application Priority Data

Jul. 28, 2010    (JP) ................................. 2010-169882

(51) Int. Cl.
*G06F 3/048* (2013.01)
*H04M 1/00* (2006.01)
*H04M 1/02* (2006.01)
*G06F 3/0482* (2013.01)
*H04M 1/725* (2006.01)

(52) U.S. Cl.
CPC ........ *H04M 1/0202* (2013.01); *H04M 1/72561* (2013.01); *H04M 1/72563* (2013.01); *G06F 3/0482* (2013.01); *H04M 1/72522* (2013.01)
USPC ............................ 715/810; 715/864; 455/566

(58) Field of Classification Search
CPC ..................... H04M 1/72522; H04M 1/72561; H04M 1/72563; H04M 1/72566; G06F 3/0482
USPC ........................ 455/566, 418; 715/810, 864
See application file for complete search history.

(56) References Cited

U.S. PATENT DOCUMENTS

| 5,638,501 | A  | * | 6/1997 | Gough et al. | ................. | 345/639 |
| 5,651,107 | A  | * | 7/1997 | Frank et al. | ................... | 715/768 |
| 6,522,347 | B1 | * | 2/2003 | Tsuji et al. | ..................... | 715/848 |
| 6,918,091 | B2 | * | 7/2005 | Leavitt et al. | ................. | 715/765 |
| 7,366,547 | B2 | * | 4/2008 | Hasegawa et al. | ............ | 455/566 |
| 7,429,993 | B2 | * | 9/2008 | Hui | ............................... | 345/629 |

(Continued)

FOREIGN PATENT DOCUMENTS

JP    2005-110059 A    4/2005

OTHER PUBLICATIONS

International Search Report and Written Opinion corresponding to PCT/JP2011/067354, dated Aug. 23, 2011.

(Continued)

*Primary Examiner* — Duc M Nguyen
(74) *Attorney, Agent, or Firm* — Lowe Hauptman & Ham, LLP

(57) ABSTRACT

According to another aspect, a mobile electronic device includes a display unit and a control unit. The display unit displays thereon additional information associated with an application program. Upon accepting a first operation performed with respect to the additional information, the control unit display a screen provided by the application program as a background of the additional information.

31 Claims, 6 Drawing Sheets

(56) References Cited

U.S. PATENT DOCUMENTS

| | | | |
|---|---|---|---|
| 8,239,779 B2* | 8/2012 | Unger et al. | 715/763 |
| 8,321,801 B2* | 11/2012 | Chaudhri et al. | 715/765 |
| 2004/0142720 A1* | 7/2004 | Smethers | 455/550.1 |
| 2005/0044500 A1* | 2/2005 | Orimoto et al. | 715/706 |
| 2005/0251754 A1* | 11/2005 | Padgett et al. | 715/779 |
| 2006/0084416 A1* | 4/2006 | Wakasa et al. | 455/414.2 |
| 2007/0018957 A1* | 1/2007 | Seo | 345/156 |
| 2007/0162942 A1* | 7/2007 | Hamynen et al. | 725/105 |
| 2008/0126986 A1* | 5/2008 | Tsukiji | 715/810 |
| 2009/0036108 A1* | 2/2009 | Cho | 455/418 |
| 2010/0005421 A1* | 1/2010 | Yoshioka | 715/835 |
| 2010/0075649 A1* | 3/2010 | Teng | 455/418 |
| 2010/0088628 A1* | 4/2010 | Flygh et al. | 715/779 |
| 2010/0299597 A1* | 11/2010 | Shin et al. | 715/702 |

OTHER PUBLICATIONS

Omoshiro Soft kara Tsukurikata made Ikkyo Shokai! Icon de Asobo!, MacPeople, Feb. 15, 2001, vol. 7, No. 4, p. 69.

* cited by examiner

FIG.4

| ID | PROGRAM | ACTIVATOR | END TOGETHER WITH ACTIVATOR |
|---|---|---|---|
| 1 | IDLE SCREEN | — | No |
| 2 | ADDITIONAL DISPLAY | 1 | No |
| 3 | BROWSER | 2 | Yes |
| 4 | SCHEDULE | 2 | Yes |

| ID | DISPLAY POSITION | PROGRAM | ADDITIONAL INFORMATION | ACTIVATION PARAMETER |
|---|---|---|---|---|
| 1 | 4 | BROWSER | NEWS | http://aaa.bbb/ |
| 2 | 5 | SCHEDULE | JULY 26 14:00 | 201007261400 |

45

MOBILE ELECTRONIC DEVICE, SCREEN CONTROL METHOD AND ADDITIONAL DISPLAY PROGRAM

CROSS-REFERENCE TO RELATED APPLICATION

This application is a National Stage of PCT international application Ser. No. PCT/JP2011/067354 filed on Jul. 28, 2011 which designates the United States, and which is based upon and claims the benefit of priority from Japanese Patent Application No. 2010-169882.

FIELD

The present disclosure relates to a mobile electronic device, a screen control method and an additional display program.

BACKGROUND

There is a known technology for displaying additional information related to a specific application program on an idle screen of an electronic device such as a mobile phone (e.g., see Patent Literature 1). By using this technology, for example, a function can be realized, in which additional information including a character string "weather forecast" is displayed on an idle screen, and a browser is activated to display a WEB page of weather forecast when a predetermined operation is performed with the additional information selected.

By using such a technology, a desired application program can be quickly activated without performing a complicated operation such as following a menu hierarchy from the idle screen to activate the desired application program.

CITATION LIST

Patent Literature

Patent Literature 1: JP-A-2005-110059

TECHNICAL PROBLEM

In the conventional technology, however, when an application program X corresponding to given additional information is activated, a screen provided by the application program X occupies a display area of a display unit. Hence, when an application program Y corresponding to another additional information needs to be activated, an operation with respect to the additional information cannot be performed until the application program X is ended.

For the foregoing reasons, there is a need for a mobile electronic device, a screen control method and an additional display program which allow the user to smoothly switch an application program to be used.

SUMMARY

According to another aspect, a mobile electronic device includes a display unit and a control unit. The display unit displays thereon additional information associated with an application program. Upon accepting a first operation performed with respect to the additional information, the control unit display a screen provided by the application program as a background of the additional information.

According to another aspect, a screen control method is executed by a mobile electronic device having a display unit. The control method includes: displaying additional information associated with an application program on the display unit; and upon accepting a predetermined operation performed with respect to the additional information, displaying a screen provided by the application program as a background of the additional information.

According to another aspect, a non-transitory storage medium stores an additional display program. When executed by a mobile electronic device having a display unit, the program causes the electronic device to execute: displaying additional information associated with an application program on the display unit; and upon accepting a predetermined operation performed with respect to the additional information, displaying a screen provided by the application program as a background of the additional information.

ADVANTAGEOUS EFFECTS OF INVENTION

A mobile electronic device, a screen control method and an additional display program according to the present invention provide an effect of allowing the user to smoothly switch an application program to be used.

BRIEF DESCRIPTION OF DRAWINGS

FIG. 4 is a diagram illustrating an example of an attribute table.

FIG. 5 is a diagram illustrating an example of additional display data.

DESCRIPTION OF EMBODIMENTS

Examples of a mobile electronic device, a screen control method and an additional display program according to the present invention will be explained in detail below with reference to the accompanying drawings. It should be noted that the present invention is not limited by the examples. In addition, the components in the explanation below include those which are easily thought of by persons skilled in the art, those which are substantially identical, and those in a scope of so-called equivalents. In the following explanation, a mobile phone is discussed as an example of the mobile electronic device; however, a target to which the present invention is applied is not limited to the mobile phone. Therefore, the present invention is also applicable to, for example, PHSs (Personal Handyphone System), smartphones, PDAs (personal digital assistant), portable navigation devices, notebook computers, and gaming devices.

Embodiment

Figure 1:
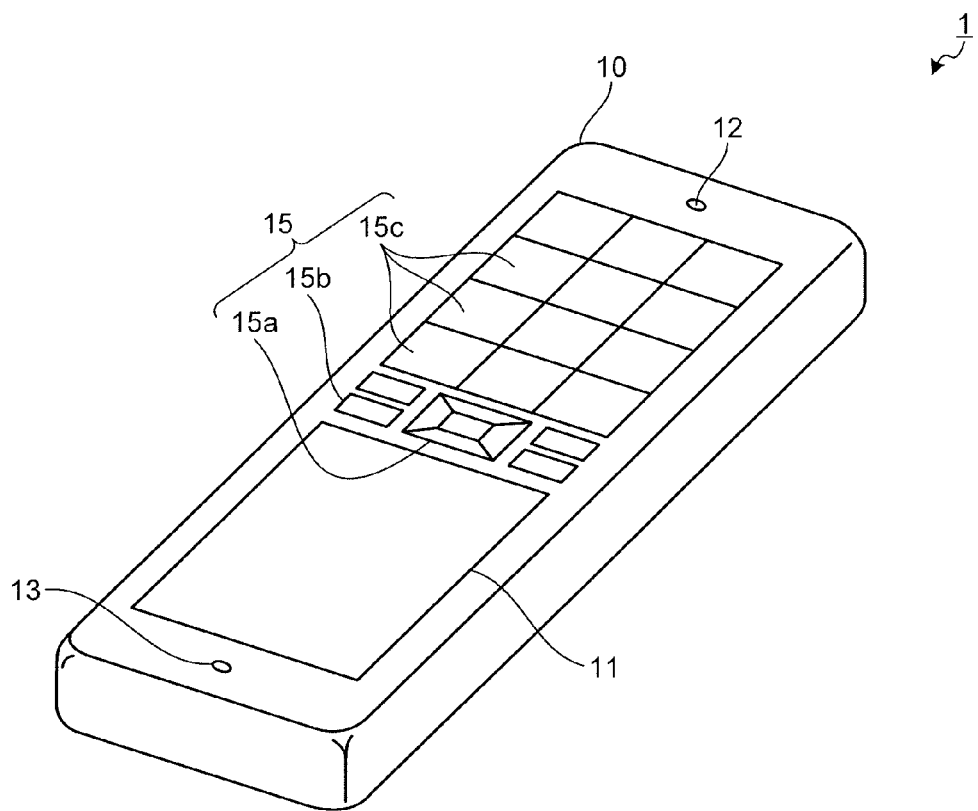
FIG. 1 is a perspective view illustrating an appearance of a mobile phone.

First of all, an appearance of a mobile phone 1 according to the present embodiment will be explained. FIG. 1 is a perspective view of the appearance of the mobile phone 1. As illustrated in FIG. 1, the mobile phone 1 includes a housing 10, a display unit 11, a microphone 12, a receiver 13, and an input unit 15.

The housing 10 is formed into, for example, a single box shape. The housing 10 is a so-called straight type housing. The housing 10 may include, for example, two housings: a first housing and a second housing. In this case, the housing 10 may be a slide type housing in which the first housing slides with respect to the second housing, or may be a folding type housing in which the first housing pivots with respect to the second housing. In other words, the configuration of the housing 10 is not limited.

The display unit 11, the microphone 12, the receiver 13, and the input unit 15 are provided in the housing 10. The microphone 12 converts a sound to an electrical signal. The receiver 13 converts an electrical signal to a sound and outputs the sound.

The input unit 15 receives a user's operation and generates a signal according to the received operation. The input unit 15 includes a direction button 15a, functions call buttons 15b each as a function calling unit, and number input buttons 15c. The direction button 15a is a button for moving a cursor appearing on the display unit 11. The functions call buttons 15b are buttons for calling various functions provided in the mobile phone 1. The number input buttons 15c are buttons for inputting numbers. The number input buttons 15c are buttons used to enter a phone number when, for example, a voice call is started.

The display unit 11 is provided with a display panel such as an LCD (Liquid Crystal Display) or an OEL (Organic Electro-Luminescence) panel. The display unit 11 displays a various function screen, an idle screen, and so on. The function screen is a screen for providing functions included in the mobile phone 1 to the user. Included in the function screens are screens for providing functions, to the user, such as a verbal communication function with other mobile phone, a mail transmission/reception function, an imaging function performed by a camera, and an audio visual function.

The idle screen is a screen in a state in which incoming and outgoing calls are awaited, or a screen in a state in which activation of an application program is awaited. In other words, the idle screen is a screen before the screen is changed to the various function screens provided by the mobile phone 1. The idle screen is sometimes called, for example, "desktop screen", "home screen", or "wallpaper".

The mobile phone 1 displays additional information on the idle screen in a superimposed manner according to additional display data set by the user. Registered in the additional display data are information to be displayed as additional information, information for specifying an application program to be activated, and a parameter to be specified upon activation of the application program, which are associated with each other. The information to be displayed as additional information includes, for example, a character string, an image, a graphic, or a combination thereof.

The additional information is displayed in, for example, a band-like area separately provided on the idle screen. The mobile phone 1 can simultaneously display a plurality of pieces of additional information on the idle screen. The mobile phone 1 then activates an application program associated with additional information according to a user's operation performed for the additional information displayed on the idle screen.

Figure 2:
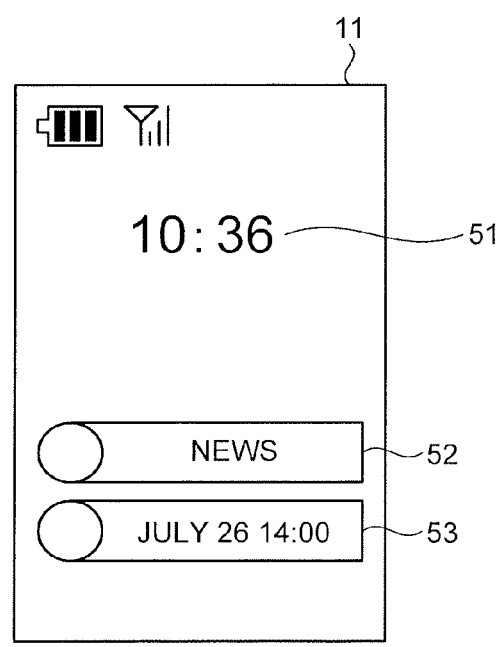
FIG. 2 is a diagram illustrating an example of an idle screen displayed by the mobile phone.

FIG. 2 illustrates an example of the idle screen displayed on the display unit 11 by the mobile phone 1. FIG. 2 is a diagram illustrating an example of the idle screen displayed by the mobile phone 1. With an example illustrated in FIG. 2, a clock 51 is displayed as part of the idle screen. With the example illustrated in FIG. 2, additional information 52 and additional information 53 are displayed on the idle screen in a superimposed manner.

The additional information 52 includes a character string of "news". In additional display data corresponding to the additional information 52, a browser program is specified as an application program to be activated. In additional display data corresponding to the additional information 52, a URL of a news site is specified as a parameter to be specified upon activation, and the character string of "news" is specified as additional information.

The user selects the additional information 52 displayed on the idle screen by, for example, operating the direction buttons 15a, and executes a predetermined operation. By executing a predetermined operation while selecting the additional information 52 displayed on the idle screen, the user can activate a browser program which is accessing the URL of the news site and browse a webpage of the news site.

The additional information 53 includes a character string of "July 26 14:00". In additional display data corresponding to the additional information 53, a schedule program is specified as an application program to be activated. In the additional display data corresponding to the additional information 53, a parameter for displaying schedule information of July 26 14:00 is specified as a parameter to be specified upon activation, and a character string of "July 26 14:00" is specified as additional information.

The user selects the additional information 53 displayed on the idle screen by, for example, operating the direction buttons 15a, and executes a predetermined operation. By executing the predetermined operation while selecting the additional information 53 displayed on the idle screen, the user can activate the schedule program which is displaying schedule information of July 26 14:00, and check the schedule.

Thus, additional information displayed on the idle screen is utilized to quickly activate the associated application program.

The application program associated with the additional information is activated by way of foreground activation or background activation according to a user's operation. In a case of the foreground activation, a function screen provided by an application program is displayed as the foreground so as to cover the idle screen and the additional information superimposed on the idle screen. In a case of the background activation, while the additional information is displayed in the foreground, a function screen provided by the application program is displayed as the background of the additional information.

Figure 3:
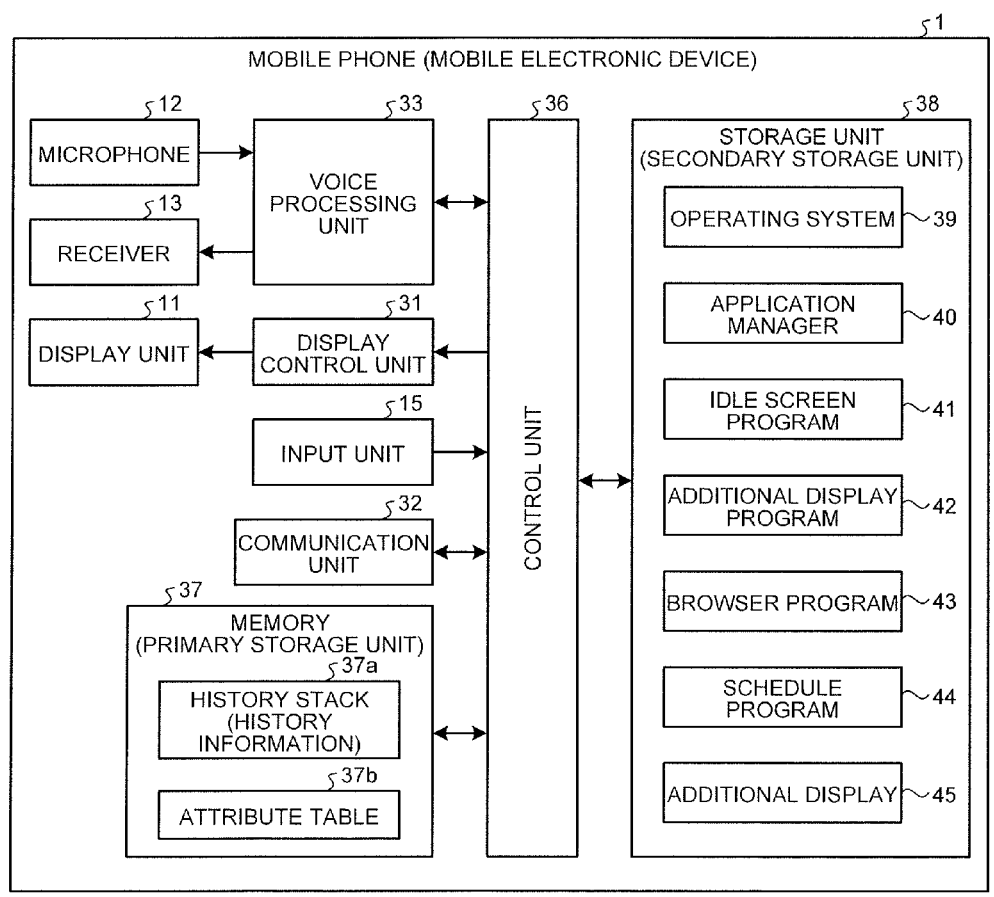
FIG. 3 is a block diagram illustrating a functional configuration of the mobile phone.

Then, a functional configuration of the mobile phone 1 illustrated in FIG. 1 will be described. FIG. 3 is a block diagram illustrating a functional configuration of the mobile phone 1. As illustrated in FIG. 3, the mobile phone 1 has the display unit 11, the microphone 12, the receiver 13, the input unit 15, a display control unit 31, a communication unit 32, a voice processing unit 33, a control unit 36, a memory 37, and a storage unit 38.

The display control unit 31 generates a screen image to be displayed on the display unit 11. The communication unit 32 has an antenna which is not illustrated, and establishes a wireless path to a base station and realizes wireless communication for voice or data communication. The voice processing unit 33 applies processing such as encoding to voice data converted into an electric signal by the microphone 12, and outputs the data to the control unit 36. The voice processing unit 33 applies processing such as decoding to voice data inputted from the control unit 36, and outputs the sound data to the receiver 13.

The control unit 36 integrally controls the entire operation of the mobile phone 1. More specifically, the control unit 36 has a processing unit such as a CPU (Central Processing Unit) which is not illustrated. The control unit 36 causes the processing unit to execute processing process based on an instruction and data included in an operating system 39 or various application programs. By controlling each unit of the mobile phone 1 based on a processing result of the processing unit, the control unit 36 realizes various functions such as a voice communication function or a mail transmitting/receiving function provided to the user from the mobile phone 1.

The operating system 39 executed by the control unit 36 has a multitask function. The multitask function enables the control unit 36 to simultaneously execute a plurality of application programs in a pseudo manner.

The memory 37 is, for example, a primary storage unit such as a RAM (Random Access Memory). The memory 37 is used as a storage area in which data used in various processing process executed by the control unit 36 is temporarily loaded. The memory 37 is used as a storage area in which an application program which is being executed in the control unit 36 is temporarily loaded. The storage unit 38 may have a function of the memory 37 without providing the memory 37.

Data stored in the memory 37 includes a history stack 37a and an attribute table 37b. The history stack 37a is history information used to manage an activation order of application programs. More specifically, the control unit 36 pushes information for identifying an activated application program to the history stack 37a every time a new application program is activated.

Principally, on the display unit 11, a function screen provided by an application program at a top of the history stack 37a, that is, an application program activated last, is displayed. When the user instructs an end of the application program by operating the input unit 15, a pop operation is performed with respect to the history stack 37a. According to the pop operation, the application program positioned at the second top of the history stack 37a moves to the top, and the function screen provided by that application program is displayed on the display unit 11.

The attribute table 37b holds information related to an application program in execution. FIG. 4 is a diagram illustrating an example of the attribute table 37b. As illustrated in FIG. 4, in the attribute table 37b, items such as ID, Program, Activator, and End Together with Activator are included, and data is registered per application program in execution.

The item of ID holds an identification number for identifying application program in execution. The item of Program holds information (for example, a name or a pass name of an application program) for specifying an application program in execution.

The item of Activator holds an identification number for identifying activator application program of the corresponding application program. The activator application program is, for example, an application program which provides a screen corresponding to an operation which triggers activation of the corresponding application program.

The item of End Together with Activator holds a value indicating whether or not execution of an application is also ended when execution of the activator application program is ended. More specifically, when the value is "Yes" and execution of the activator application program is ended, execution of the corresponding application program is also ended. When the value is "No", even after execution of the activator application program is ended, execution of the corresponding application program continues.

The storage unit 38 is a secondary storage unit which has a non-volatile storage device (for example, a flash memory). The storage unit 38 stores data and programs utilized in various processing processes in the control unit 36. The programs stored in the storage unit 38 include the operating system 39, an application manager 40, an idle screen program 41, an additional display program 42, a browser program 43 and a schedule program 44. The data stored in the storage unit 38 includes the additional display data 45.

The application manager 40 realizes a function of exchanging information between various programs executed by the control unit 36. The idle screen program 41 causes the display unit 11 to display the idle screen.

The additional display program 42 realizes registration, update and deleting of data in the additional display data 45, and displays additional information on the idle screen based on the additional display data 45. The additional display program 42 activates an application program associated with additional information by way of foreground activation or background activation according to an operation performed with respect to additional information displayed on the idle screen.

The browser program 43 causes a webpage corresponding to a specified URL to be acquired and causes the display unit 11 to display the acquired webpage. The schedule program 44 realizes registration, update and deleting of schedule information to a schedule database which is not illustrated, and notifies a schedule based on schedule information registered in the database.

The additional display data 45 holds information related to additional information to be displayed on the idle screen. FIG. 5 is a diagram illustrating an example of the additional display data 45. As illustrated in FIG. 5, in the additional display data 45, items such as ID, Display Position, Program, Additional information, and Activation Parameter are included, and data is registered per additional information to be displayed on the idle screen.

The item of ID holds an identification number for identifying data registered in the additional display data 45. The item of Display Position holds a position of the idle screen at which additional information is displayed. For example, assuming that pieces of additional information are tightly arranged in a band-like manner on the idle screen, a position number corresponding to a position of each of the additional information in their positional order is set in the item of Display Position.

The item of Program holds information (for example, a name or a pass name of an application program) for specifying an application program to be activated. The item of Additional Information holds, for example, a character string to be displayed as additional information. The item of Activation Parameter holds a parameter to be specified upon activation of an application program.

With data in the first row of the additional display data 45 illustrated in FIG. 5, "1" is set in the item of ID, "4" is set in the item of Display Position, "browser" is set in the item of Program, "news" is set in the item of Additional Information, and "http://aaa.bbb/" is set in the item of Activation Parameter.

This row indicates that this data is identified based on an identification number of "1" and a character string of "news" is displayed at a "4"-th position on the idle screen as additional information corresponding to this data. This row indicates that, when additional information displayed as "news" is selected and a predetermined operation is performed, the browser program 43 is activated using the URL of "http://aaa.bbb/" as an activation parameter.

With data in the second row of the additional display data 45 illustrated in FIG. 5, "2" is set in the item of ID, "5" is set in the item of Display Position, "schedule" is set in the item of Program, "July 26 14:00" is set in the item of Additional Information, and "201007261400" is set in the item of Activation Parameter.

This row indicates that this data is identified based on an identification number of "2" and a character string of "July 26 14:00" is displayed at a "5"-th position on the idle screen as additional information corresponding to this data. This row indicates that, when additional information displayed as "July 26 14:00" is selected and a predetermined operation is performed, the schedule program 44 is activated using the character string of "201007261400" indicating 14:00 on Jul. 26, 2010 as an activation parameter.

When the additional display data 45 is as illustrated in FIG. 5, the display unit 11 of the mobile phone 1 displays, for example, the idle screen as illustrated in FIG. 2.

Then, activation of an application by a function provided by the additional display program 42 will be described in more details with reference to FIGS. 6 and 7. In this case, the additional display data 45 is as illustrated in FIG. 5, and the display unit 11 of the mobile phone 1 displays the idle screen as illustrated in FIG. 2 in advance.

Figure 6:
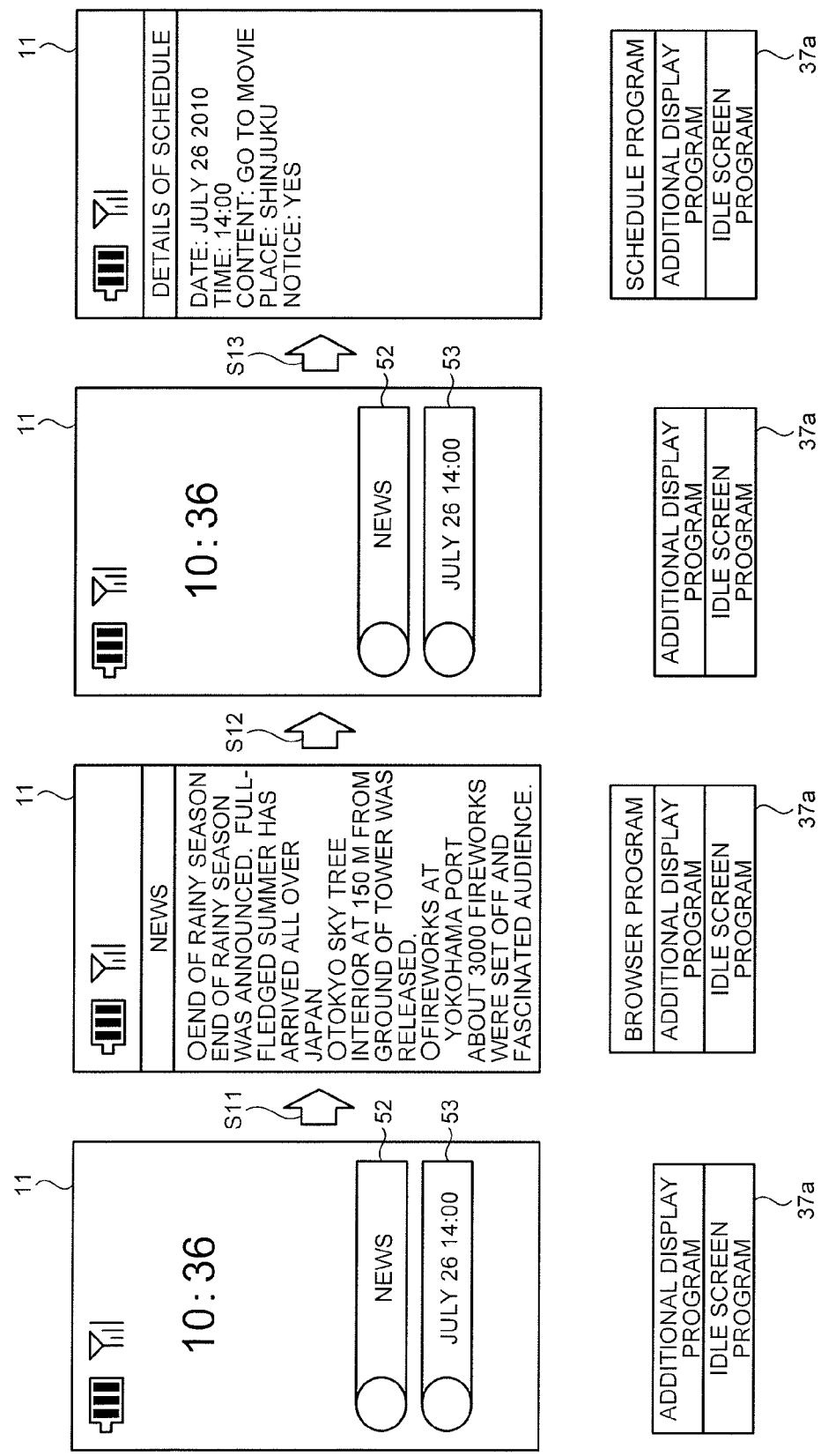
FIG. 6 is a diagram illustrating an operation example in case that an application program is activated by way of foreground activation.

FIG. 6 is a diagram illustrating an operation example in case that an application program is activated by way of foreground activation. As illustrated in FIG. 6, at a stage in which the idle screen as illustrated in FIG. 2 is displayed on the display unit 11 in advance, identification information of the additional display program 42 is stored at the top of the history stack 37a and identification information of the idle screen program 41 is stored at the second top.

At this stage, the additional information 52 and 53 provided by the additional display program 42 whose identification information is stored at the top of the history stack 37a are displayed as the foreground. The additional information 52 and 53 occupy only part of the display area of the display unit 11. As the background of the additional information 52 and 53, the idle screen provided by the idle screen program 41 whose identification information is stored in the next position of the history stack 37a is displayed.

At this stage, the mobile phone 1 receives an operation with respect to the idle screen and the operation with respect to the additional information 52 and 53. Which one is determined as a target is switched, for example, through the user pushing one of the functions call buttons 15b or selecting a predetermined item from a menu displayed by pushing one of the functions call buttons 15b.

When the additional information 52 and 53 are the operation targets, one of the additional information 52 and 53 is selected. Which one of the additional information 52 and 53 is selected is switched, for example, through the user pushing one of the direction buttons 15a.

At Step S11, when the additional information 52 is selected, an operation of instructing activation of an application program by way of foreground activation is performed. This operation is performed, for example, through the user pushing one of the functions call buttons 15b or selecting a predetermined item from the menu displayed by pushing one of the functions call buttons 15b.

In response to this operation, the control unit 36 activates the browser program 43 registered in the additional display data 45 in association with the additional information 52 while specifying an activation parameter registered in the additional display data 45. The control unit 36 pushes identification information of the activated browser program 43 to the history stack 37a. As a result, identification information of the browser program 43 is positioned at the top of the history stack 37a, and the function screen provided by the browser program 43 is displayed as the foreground. More specifically, a webpage indicated by a URL specified as an activation parameter is displayed as the foreground.

Subsequently, at Step S12, an operation of instructing an end of the browser program 43 is performed. In response to this operation, the control unit 36 ends the browser program 43. The control unit 36 performs a pop operation with respect to the history stack 37a and causes identification information of the browser program 43 to pop out of the history stack 37a. As a result, identification information of the additional display program 42 is positioned at the top of the history stack 37a again, and a screen returns to a screen before activation of the browser program 43.

At Step S13, after the additional information 53 is selected, an operation of instructing activation of an application program by way of foreground activation is performed.

In response to this operation, the control unit 36 activates the schedule program 44 registered in the additional display data 45 in association with the additional information 53 while specifying an activation parameter registered in the additional display data 45. The control unit 36 pushes identification information of the activated schedule program 44 to the history stack 37a. As a result, identification information of the schedule program 44 is positioned at the top of the history stack 37a, and the function screen provided by the schedule program 44 is displayed as the foreground. More specifically, schedule information of July 26 14:00 corresponding to a specified activation parameter is displayed as the foreground.

By activating an application program corresponding to additional information by way of foreground activation, the user can activate an application program in a state where an activation parameter registered in advance is specified. That is, the user can immediately utilize the function provided by the application program. When, for example, a webpage of news is referred to, process of activating the browser program 43 by tracking through the menu from the idle screen, and inputting a URL to the function screen provided by the browser program 43 is generally performed. Process of operating the additional information 52 can be much more easily executed than this general process.

Figure 7:
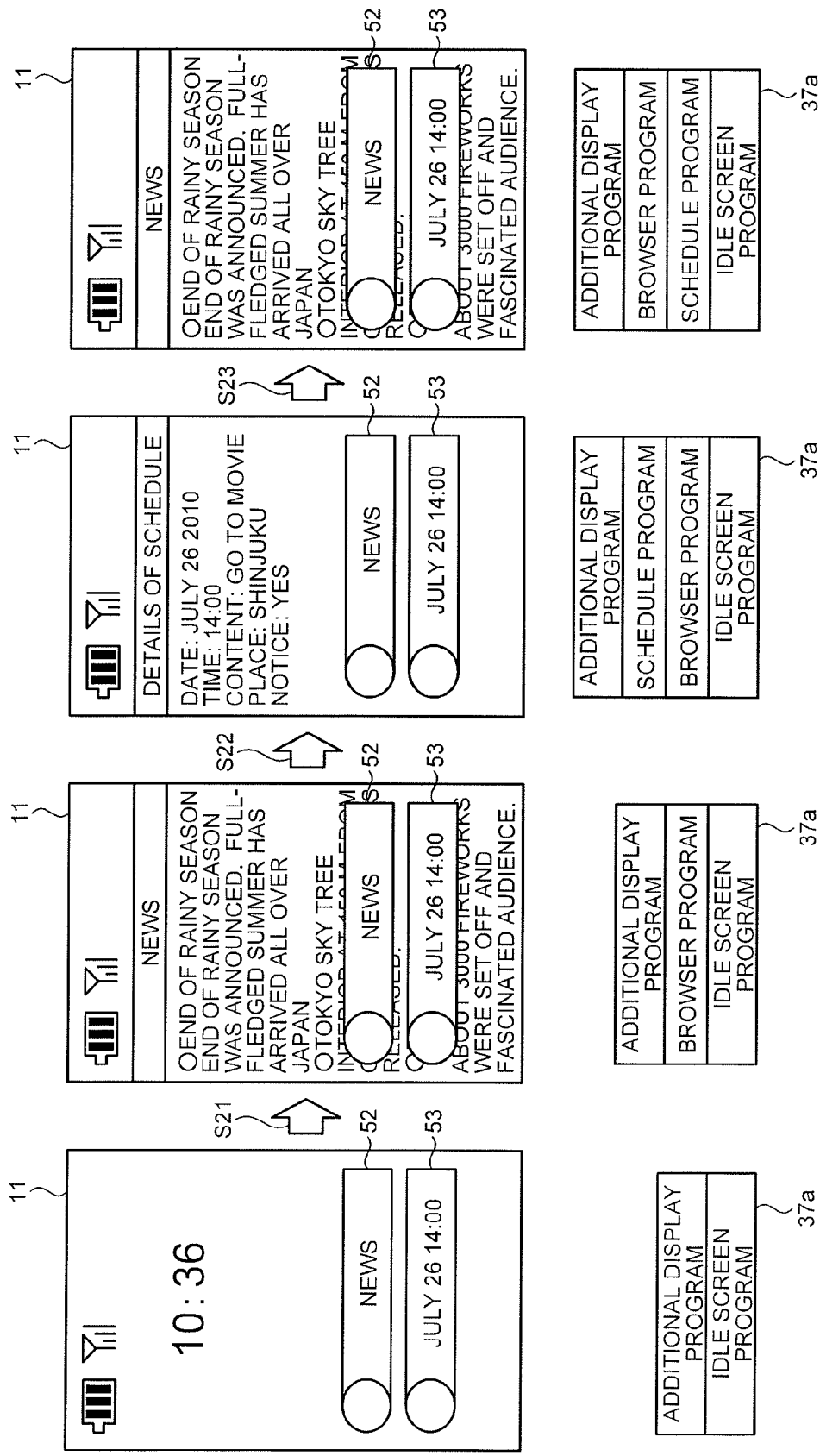
FIG. 7 is a diagram illustrating an operation example in case that an application program is activated by way of background activation.

FIG. 7 is a diagram illustrating an operation example in case that an application program is activated by way of background activation. As illustrated in FIG. 7, at a stage in which the idle screen as illustrated in FIG. 2 is displayed on the display unit 11 in advance, identification information of the additional display program 42 is stored at the top of the history stack 37a. The identification information of the idle screen program 41 is stored at the second top.

At Step S21, when the additional information 52 is selected, an operation of instructing activation of an application program by way of background activation is performed. This operation is executed, for example, through the user pushing one of the functions call buttons 15b or selecting a predetermined item from the menu displayed by pushing one of the functions call buttons 15b.

In response to this operation, the control unit 36 activates the browser program 43 registered in the additional display data 45 in association with the additional information 52 while specifying an activation parameter registered in the additional display data 45. The control unit 36 performs control of inserting the identification information of the activated browser program 43 to the position next to the top of the history stack 37a.

As a result, in the history stack 37a, the identification information of the additional display program 42 is stored at the top, and the identification information of the browser program 43 is stored at the second top. The display unit 11 displays the additional information displayed by the additional display program 42 in the foreground, and displays the function screen provided by the browser program 43 as the background. More specifically, a webpage indicated by a URL specified as an activation parameter is displayed as the background of the additional information.

The control unit 36 registers data corresponding to the browser program 43 in the attribute table 37b, sets the identification number of the additional display program 42 to the item of Activator of this data, and sets "Yes" to the item of End Together with Activator of this data. According to this setting, when execution of the additional display program 42 is ended at this stage, execution of the browser program 43 is also ended. After the browser program 43 is ended, the display unit 11 displays the idle screen provided by the idle screen program 41.

At this stage, the mobile phone 1 receives an operation with respect to the function screen provided by the browser program 43 and an operation with respect to the additional information 52 and 53. Which one is determined as a target is switched, for example, through the user pushing one of the functions call buttons 15b or selecting a predetermined item from a menu displayed by pushing one of the functions call buttons 15b.

Subsequently, at Step S22, after the additional information 53 is selected, an operation of instructing activation of an application program by way of background activation is performed.

In response to this operation, the control unit 36 activates the schedule program 44 registered in the additional display data 45 in association with the additional information 53 while specifying an activation parameter registered in the additional display data 45. The control unit 36 performs control of inserting the identification information of the activated schedule program 44 to the position next to the top of the history stack 37a.

As a result, in the history stack 37a, the identification information of the additional display program 42 is stored at the top, and the identification information of the schedule program 44 is stored at the second top. The display unit 11 displays the additional information displayed by the additional display program 42 in the foreground, and displays the function screen provided by the schedule program 44 as the background. More specifically, schedule information of July 26 14:00 corresponding to a specified activation parameter is displayed as the background of additional information.

The control unit 36 registers data corresponding to the schedule program 44 in the attribute table 37b, sets the identification number of the additional display program 42 to the item of Activator of this data, and sets "Yes" to the item of End Together with Activator of this data. According to this setting, when execution of the additional display program 42 is ended at this stage, execution of the browser program 43 and the schedule program 44 is also ended. Then, the display unit 11 displays the idle screen provided by the idle screen program 41.

At this stage, the mobile phone 1 receives an operation with respect to the function screen provided by the schedule program 44 and an operation with respect to the additional information 52 and 53. Which one is determined as a target is switched, for example, through the user pushing one of the functions call buttons 15b or selecting a predetermined item from a menu displayed by pushing one of the functions call buttons 15b.

Subsequently, at Step S23, after the additional information 52 is selected again, an operation of instructing activation of an application program by way of background activation is performed.

In response to this operation, the control unit 36 moves the identification information of the browser program 43 which has already been activated, to the position next to the top of the history stack 37a. As a result, in the history stack 37a, the identification information of the additional display program 42 is stored at the top, and the identification information of the browser program 43 is stored at the second top. The display unit 11 displays the additional information displayed by the additional display program 42 in the foreground, and displays the function screen provided by the browser program 43 as the background.

By activating the application program corresponding to additional information by way of background activation, it is possible to display a screen other than an idle screen while displaying the additional information. Even when the screen other than the idle screen is displayed, it is possible to perform an operation with respect to additional information. As at Step S23 in FIG. 7, if an application program activation of which is requested has already been activated, a function screen provided by the application program which has already been activated is instantly displayed without activating the application program again.

Therefore, when, for example, a function screen needs to be checked by activating an application program corresponding to each of a plurality of pieces of additional information displayed on the idle screen in a superimposed manner, it is possible to smoothly switch the function screen to be displayed by activating the application program by way of background activation.

Figure 8:
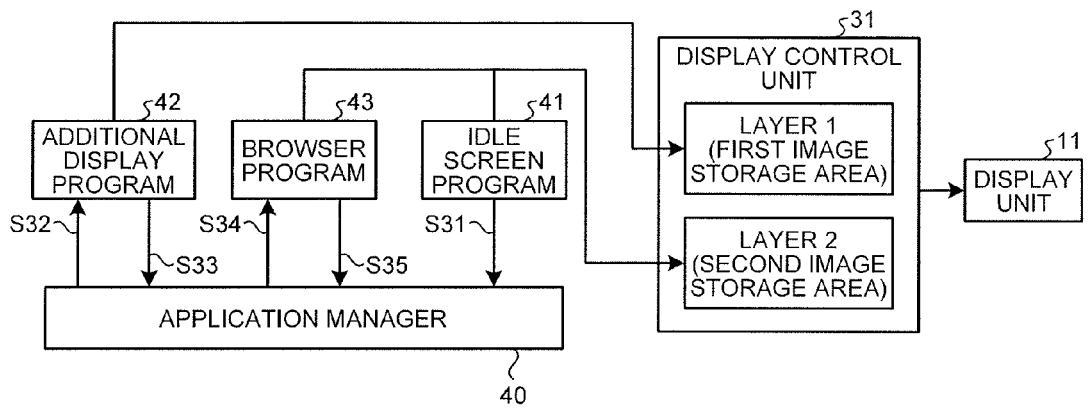
FIG. 8 is a diagram illustrating the correlation between functions provided by application programs upon background activation.

Then, the correlation between functions provided by application programs upon background activation will be described. FIG. 8 is a diagram illustrating the correlation between functions provided by application programs upon background activation. First of all, at Step S31, when activation of the additional display program 42 is requested based on the function provided by the idle screen program 41, the control unit 36 activates the additional display program 42 at Step S32. Content of an activation request based on the function provided by the idle screen program 41 is reflected in the function provided by the additional display program 42 by the function provided by the application manager 40.

The control unit 36 draws the idle screen provided by the idle screen program 41 to the layer 2 provided in the display control unit 31, and draws additional information provided by the additional display program 42 to the layer 1 provided in the display control unit 31. The layer 1 and the layer 2 are storage areas which hold virtual screens, and the display control unit 31 synthesizes content drawn in the layer 1 and content drawn in the layer 2 to output to the display unit 11 in such a manner that the content drawn in the layer 1 comes to the foreground. As a result, the display unit 11 displays the screen as illustrated in FIG. 2.

Subsequently, at Step S33, when activation of the application program corresponding to the additional information 52 by way of background activation is requested based on a function provided by the additional display program 42, the control unit 36 activates the browser program 43 at Step S34. Content of an activation request based on the function provided by the additional display program 42 is reflected in the function provided by the browser program 43 by the function provided by the application manager 40.

At Step S35, the control unit 36 stores identification information of the browser program 43 to a position next to the top of the history stack 37a based on the function provided by the browser program 43.

The control unit 36 draws the function screen provided by the browser program 43 to the layer 2 provided in the display control unit 31, and draws additional information provided by the additional display program 42 to the layer 1 provided in the display control unit 31. As a result, the display unit 11 superimposes the additional information provided by the additional display program 42 on the function screen provided by the browser program 43 to display.

Figure 9:
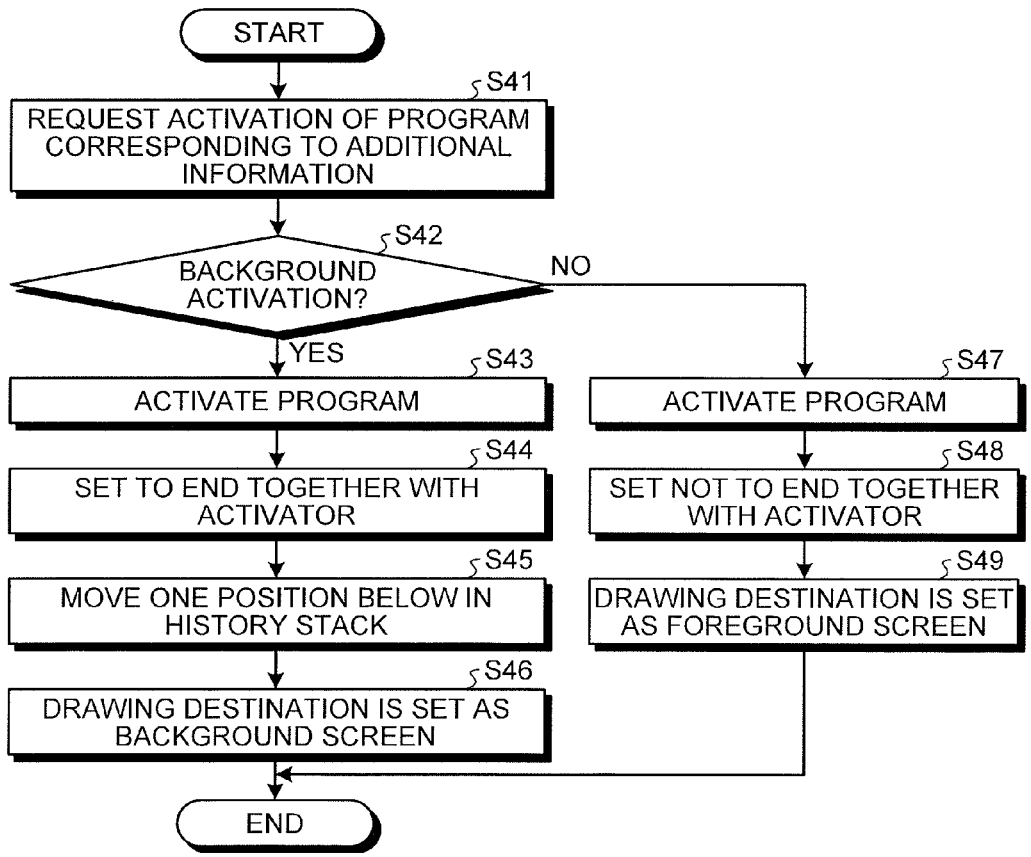
FIG. 9 is a flowchart illustrating an operation of the mobile phone in case that activation of an application program corresponding to additional information is requested.

Then, an operation of the mobile phone 1 in case that activation of an application program corresponding to additional information is requested will be described. FIG. 9 is a flowchart illustrating an operation of the mobile phone 1 in case that activation of an application program corresponding to additional information is requested. As illustrated in FIG. 9, when activation of the application program corresponding to the additional information is requested at Step S41, the control unit 36 determines whether or not activation by way of background activation is requested at Step S42.

When activation by way of background activation is requested (Yes at Step S42), the control unit 36 activates an application program activation of which is requested at Step S43. By activating the application program, identification information of this application program is stored at the top of the history stack 37a.

Subsequently, the control unit 36 sets the attribute table 37b such that the activated application program ends together with the activator at Step S44, and moves identification information of the activated application program one position below in the history stack 37a at Step S45. The control unit 36 sets a drawing destination of the function screen provided by the activated application program as the layer 2, that is, the background screen, at Step S46.

When activation by way of foreground activation is requested instead of background activation (No at Step S42), the control unit 36 activates an application program activation of which is requested at Step S47. By activating the application program, identification information of this application program is stored at the top of the history stack 37a.

Subsequently, the control unit 36 sets the attribute table 37b such that the activated application program does not end together with the activator at Step S48. The control unit 36 sets a drawing destination of the function screen provided by the activated application program as the layer 1, that is, the foreground screen, at Step S49.

As described above, with the present embodiment, a function screen provided by an activated application program can be displayed as the background of additional information, and therefore the user is allowed to smoothly switch an application program to be used, by operating additional information, even after the application program is activated.

The configuration of the mobile phone 1 according to the present embodiment can be variously changed within a range which does not deviate from the scope of the present invention. For example, a function provided by each program executed by the mobile phone 1 can be moved to another program, dispersed, or consolidated as required.

The function provided by each program executed by the mobile phone 1 may operate an application program activated by way of background activation in the same way as the application program activated by way of foreground activation. By causing the function provided by each program executed by mobile phone 1 to operate the application program activated by way of foreground activation in the same way as the application program activated by way of background activation, an operation of an application may be switched after activation.

Although the display control unit 31 has two areas of the layer 1 and the layer 2 as storage areas which hold virtual screens in the above example, the display control unit 31 may have three or more storage areas which hold virtual screens. In this case, the control unit 36 selects a destination to draw an output of an application program according to, for example, an activation order.

Although the activation order of application programs is managed using the history stack 37a in the above example, the activation order may be managed using other means.

The invention claimed is:

1. A mobile electronic device comprising:
a display unit for displaying thereon additional information associated with an application program; and
a control unit configured to, upon accepting first operation performed with respect to the additional information, display a screen provided by the application program as a background of the additional information,
wherein the control unit is configured to, upon accepting second operation performed with respect to the additional information, display the screen provided by the application program as a foreground of the additional information.

2. The mobile electronic device according to claim 1, further comprising:
a display control unit including a first screen storage area and a second screen storage area, a screen stored in the first screen storage area and a screen stored in the second screen storage area being synthesized to be output to the display unit in such a manner that the screen stored in the first screen storage area is displayed as a foreground, wherein
the control unit is configured to,
upon accepting the first operation performed with respect to the additional information, output the additional information to the first screen storage area and output the screen provided by the application program to the second screen storage area, and,
upon accepting the second operation performed with respect to the additional information, output the screen provided by the application program to the first screen storage area.

3. The mobile electronic device according to claim 1, further comprising:
a storage unit for storing history information for managing an activation order of an application program, wherein
the control unit is configured to,
upon accepting the first operation performed with respect to the additional information, set the history information such that the application program associated with the additional information is activated earlier than the application program for displaying the additional information, and,
upon accepting the second operation performed with respect to the additional information, store in the storage unit the history information indicating that the application program associated with the additional information is activated last.

4. The mobile electronic device according to claim 1, wherein
the control unit is configured to, upon accepting the first operation performed with respect to the additional information, display the additional information on the display unit to overlap the screen provided by the application program as the background of the additional information.

5. The mobile electronic device according to claim 1, wherein
the control unit is configured to, upon accepting the second operation performed with respect to the additional information, display the screen that is provided by the application program as the foreground of the additional information, on the display unit to overlap the additional information.

6. The mobile electronic device according to claim 1, further comprising a storage unit configured to store history information for managing an activation order of an application program to display the screen that is provided by the application program,
wherein the control unit is configured to, upon accepting the first operation performed with respect to the additional information, display the additional information on the display unit to overlap the screen that is provided by the application program based on the activation order as the background of the additional information.

7. The mobile electronic device according to claim 1, wherein
the screen is a function screen to provide functions associated with the application program, and
the control unit is configured to change a display of the function screen based on the additional information.

8. The mobile electronic device according to claim 1, wherein the control unit is configured to, when the application program is already being activated, display the screen without activating the application program.

9. The mobile electronic device according to claim 1, wherein the control unit is configured to, when the application program is already being activated, switch the screen provided by the application program as the background of the additional information according to the first operation.

10. The mobile electronic device according to claim 1, wherein the control unit is configured to cause the display unit to display the additional information and the screen provided by the application program as the foreground or the background of the additional information, on the display unit to overlap an idle screen.

11. The mobile electronic device according to claim 1, wherein the first operation consists of a single operation and the second operation consists of a single operation.

12. The mobile electronic device according to claim 1, wherein the control unit is configured to display the screen by activating the application program.

13. The mobile electronic device according to claim 1, wherein each of a plurality of pieces of additional information is associated with one of a plurality of application programs, and
the control unit is configured to switch the application program to activate according to the first operation.

14. A screen control method executed by a mobile electronic device having a display unit, the screen control method comprising:

displaying additional information associated with an application program on the display unit;
upon accepting first operation performed with respect to the additional information, displaying a screen provided by the application program as a background of the additional information; and
upon accepting second operation performed with respect to the additional information, displaying the screen provided by the application program as a foreground of the additional information.

15. The screen control method according to claim 14, comprising:
upon accepting the first operation performed with respect to the additional information, displaying the additional information on the display unit to overlap the screen provided by the application program as the background of the additional information.

16. The screen control method according to claim 14, comprising:
upon accepting the second operation performed with respect to the additional information, displaying the screen that is provided by the application program as the foreground of the additional information, on the display unit to overlap the additional information.

17. The screen control method according to claim 14, further comprising:
storing history information for managing an activation order of an application program to display the screen that is provided by the application program, and
upon accepting the first operation performed with respect to the additional information, displaying the additional information on the display unit to overlap the screen that is provided by the application program based on the activation order as the background of the additional information.

18. The screen control method according to claim 14, wherein
the screen is a function screen to provide functions associated with the application program, and
the screen control method further comprises changing a display of the function screen based on the additional information.

19. The screen control method according to claim 14, comprising:
when the application program is already being activated, displaying the screen without activating the application program.

20. The screen control method according to claim 14, comprising:
when the application program is already being activated, switching the screen provided by the application program as the background of the additional information according to the first operation.

21. The screen control method according to claim 14, comprising:
displaying the additional information and the screen provided by the application program as the foreground or the background of the additional information on the display unit to overlap an idle screen.

22. The screen control method according to claim 14, wherein
the first operation consists of a single operation and the second operation consists of a single operation.

23. A non-transitory storage medium that stores an additional display program for causing, when executed by a mobile electronic device having a display unit, the electronic device to execute:

displaying additional information associated with an application program on the display unit;

upon accepting first operation performed with respect to the additional information, displaying a screen provided by the application program as a background of the additional information; and upon accepting second operation performed with respect to the additional information, displaying the screen provided by the application program as a foreground of the additional information.

24. The non-transitory storage medium according to claim 23, wherein the display unit is caused to, when the first operation performed with respect to the additional information is accepted, display the additional information on the display unit to overlap the screen provided by the application program as the background of the additional information.

25. The non-transitory storage medium according to claim 23, wherein the display unit is caused to, when the second operation performed with respect to the additional information is accepted, display the screen that is provided by the application program as the foreground of the additional information, on the display unit to overlap the additional information.

26. The non-transitory storage medium according to claim 23, wherein the electronic device further includes a storage unit, the storage unit is caused to store history information for managing an activation order of an application program to display the screen that is provided by the application program, and the display unit is caused to, when the first operation performed with respect to the additional information is accepted, display the additional information on the display unit to overlap the screen that is provided by the application program based on the activation order as the background of the additional information.

27. The non-transitory storage medium according to claim 23, wherein the screen is a function screen to provide functions associated with the application program, and the electronic device is caused to change a display of the function screen based on the additional information.

28. The non-transitory storage medium according to claim 23, wherein the display unit is caused to, when the application program is already being activated, display the screen without activating the application program.

29. The non-transitory storage medium according to claim 23, wherein the electronic device is caused to, when the application program is already being activated, switch the screen provided by the application program as the background of the additional information according to the first operation.

30. The non-transitory storage medium according to claim 23, wherein the display unit is caused to display the additional information and the screen provided by the application program as the foreground or the background of the additional information, on the display unit to overlap an idle screen.

31. The non-transitory storage medium according to claim 23, wherein the first operation consists of a single operation and the second operation consists of a single operation.

* * * * *